Nov. 24, 1953  T. J. SWEGER ET AL  2,660,267
BRAKEHEAD WEAR PLATE AND KEY WEDGE
Filed June 2, 1950  2 Sheets-Sheet 1
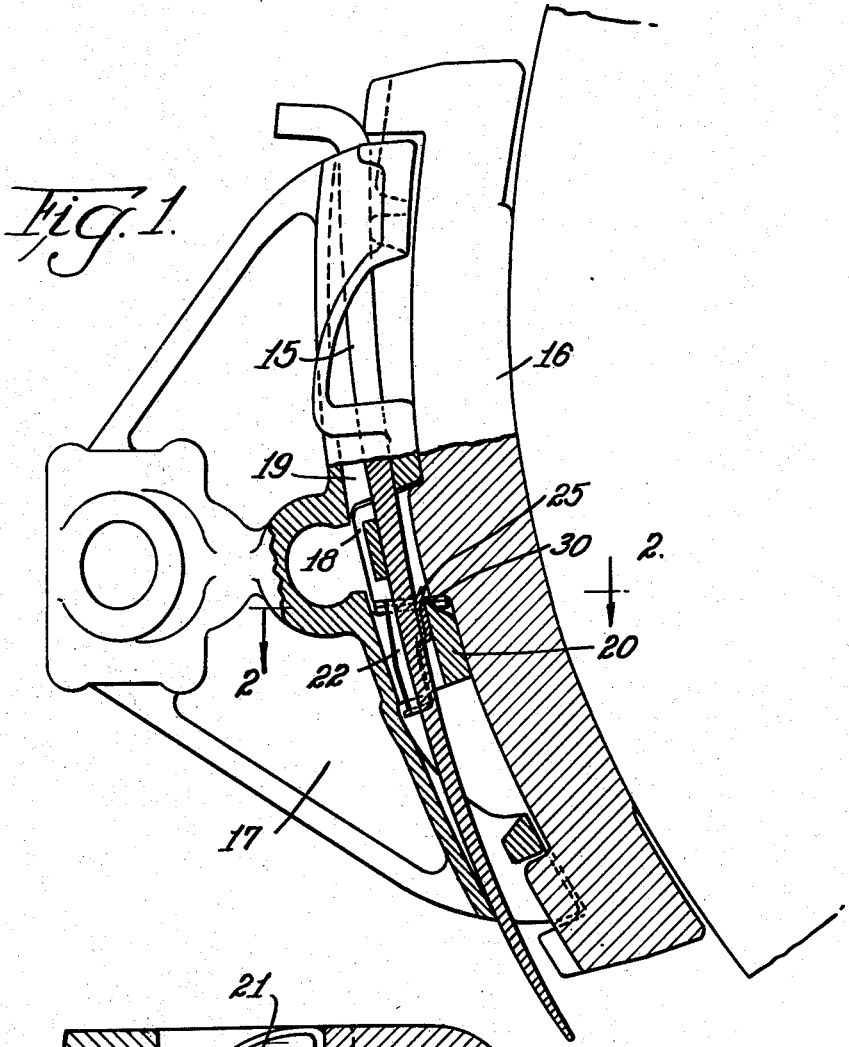
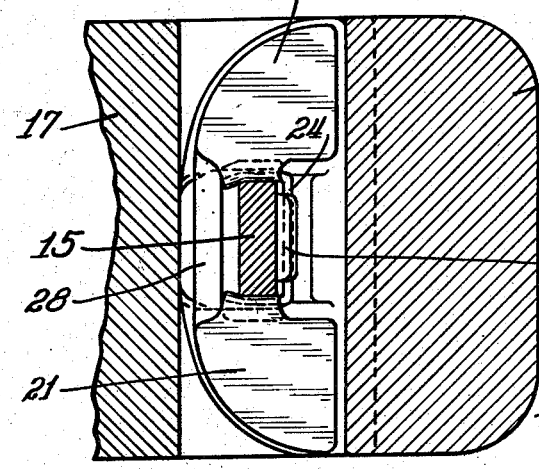
INVENTORS:
Theodore J. Sweger
and Malcolm S. Johnson
By:— George Heideman Att'y Nov. 24, 1953 T. J. SWEGER ET AL 2,660,267
BRAKEHEAD WEAR PLATE AND KEY WEDGE
Filed June 2, 1950 2 Sheets-Sheet 2

INVENTORS.
Theodore J. Sweger
and Malcolm S. Johnson
By:— George Heidman
Att'y.

Patented Nov. 24, 1953

2,660,267

UNITED STATES PATENT OFFICE 2,660,267

BRAKEHEAD WEAR PLATE AND KEY WEDGE

Theodore J. Sweger and Malcolm S. Johnson, Chicago, Ill., assignors to Illinois Railway Equipment Company, Chicago, Ill., a corporation of Illinois Application June 2, 1950, Serial No. 165,692

3 Claims. (Cl. 188—236)

Our invention is designed to take the wear encountered by the brake head lugs as a result of the jarring or chattering of the brake shoe in the standard present-day type of brake head and brake shoe.

The invention has for its object the provision of a device which may be easily and quickly applied to the brake head and which utilizes the key receiving opening in the brake head for securing the device to the brake head; the securement or interengaging relation being automatically effected when the brake shoe key is driven into place; the wear plate locking means being within the confines of the head lugs which support the brake shoe in place and also function to retain the brake shoe key in place.

The construction and aforementioned purposes will all be readily comprehended from the following detail description of the accompanying drawings wherein:

Figure 1 is a side elevation of a brake head and shoe with portions broken away and in section with our improved wear plate and key wedge means applied and also in section.

Figure 2 is a transverse sectional view taken on the line 2—2 of Figure 1 and looking in the direction of the arrows.

Figure 3:
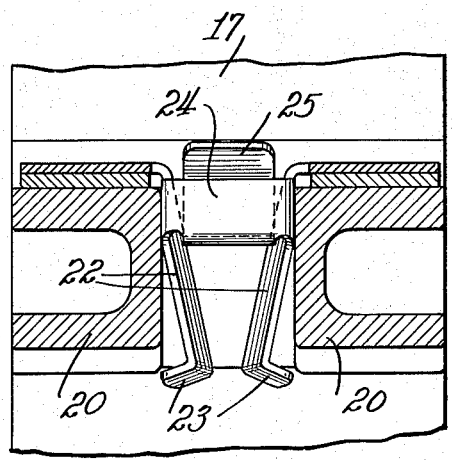
Figure 3 is a cross-section through the shoe supporting lug of the brake head with our improved wear plate and wedge applied illustrating its initial condition before the shoe locking key is applied.

Our improved means is especially intended for the standard type of brake heads and shoes at present in use on the railroads of this country without necessitating alterations or changes in construction and involves means for automatically effecting locking engagement with the brake head.

In this standard type, the brake shoe is provided with a lug which fits between a pair of vertically spaced lugs on the brake head, and as the heads and shoes consist of two rough castings, certain tolerances in manufacture are allowed with the result that a tight fit between the head and shoe is not obtained and considerable clearance between the shoe lug and the spaced head lugs exists which permits excessive play between the shoe lug and the shoe supporting lug of the head.

The brake shoes are of hard cast iron while the brake heads are of malleable iron and hence the excessive vertical play or vibration when the train is in motion and during brake application causes the shoe lug to cut into and wear away the shoe supporting lug on the brake head. This excess play between shoe and head increases the wear to such an extent that the life of the head is materially shortened and frequent, expensive renewal of the brake head made necessary.

An ideal braking condition is obtained by firmly anchoring the shoe to the head so that the two members move as a unit and as such condition is not obtainable with the present methods of manufacture, we have devised our improved wear plate and wedge adapted to take up the play and wear between the shoe and head lugs.

These head and shoe lugs are provided with vertical passages or openings to receive the usual key 15 whereby the shoe 16 is removably secured to the head 17; the shoe 16 having a lug 18 which fits rather loosely between the pair of vertically spaced lugs 19, 20 on the forward face of the brake head 17; and the greatest wear occurring on the upper face of the shoe supporting lug 20. Our improved means therefore is formed for application to the supporting lug 20 and consists of a hard sheet metal element formed with two lobes or plate-like portions 21, 21, see Figure 5, preferably provided with arcuate rear and outer side edges, which are intended to extend toward the brake head.

The lobes or plate portions at their opposing edges are provided with downwardly extending legs 22, 22 of length slightly greater than the vertical dimension or thickness of the head lug 20, so that the lower outwardly bent toes or ends 23, 23 may extend beneath the head lug 20 after proper assembly.

Figure 5:
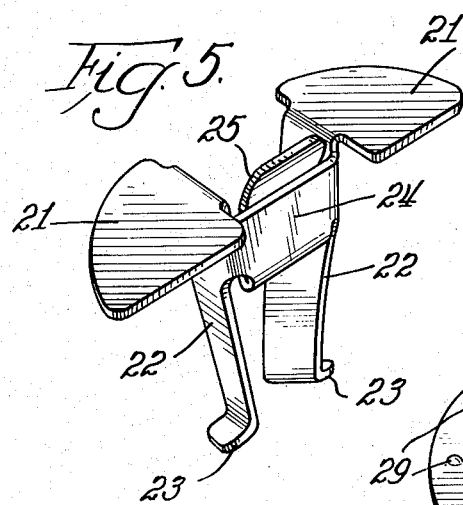
Figure 5 is a perspective view of the wear plate and wedge and locking means.

The upper ends of the two legs 22, 22 are also united by a flat bar portion or strip 24, integral with the forward edges of the legs 22, 22 and this strip portion 24, at its bottom edge is provided with an integral tongue 25, bent upwardly on the inner or rear side as clearly seen in Figure 5; the upper end of the tongue curving slightly forward and above the bar portion 24.

The two legs 22, 22 preferably have a slight transverse twist and slope toward each other as more clearly seen in Figure 5, with the rear edges closer together, thereby enabling easy insertion into the key passage of the head lug.

The two lobes or plate-like portions 21, 21 are spaced apart to cover the top of head lug 20 on opposite sides of the key receiving passage (as shown in Figure 3) in lug 20, into which the legs 22, 22 are inserted, bringing the toes 23, 23 in line with the bottom face of the head lug 20. The device is applied with the straight edges of the lobes 21, 21 and flat bar portion 24 facing toward the shoe and the upstanding and somewhat springy tongue 25 in bearing and frictional contact with a flat face of the shoe locking pin or key 15, thereby bindingly holding the key against accidental or upward creeping movement and causing the key and shoe to be forced slightly rearward and thereby hold the rear face of the shoe in firm relation with the head.

Figure 4:
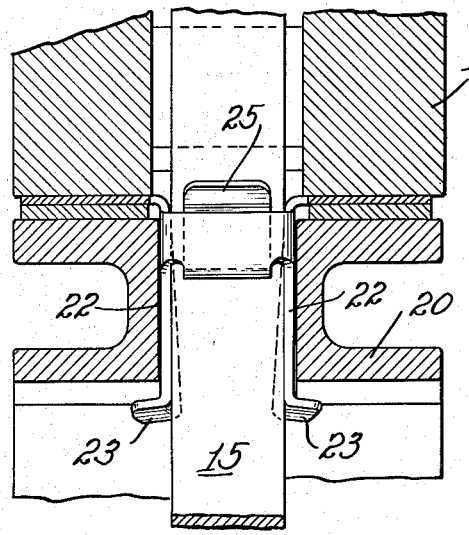
Figure 4 is a similar view with a portion of the shoe locking key in place and the wear plate and wedge in final locking condition.

As the key 15 is driven into place, it passes between the legs 22, 22 causing them to spread apart and untwist into substantially parallel relation with the end walls of the key passage as shown in Figure 4, and forcing the toes 23, 23 into holding relation with the bottom of the head lug 20 against accidental removal from the head lug after the key 15 has been withdrawn for the purpose of renewing the shoe, as the key 15 spreads and untwists the legs 22, 22 into snug relation with the side walls of the passage in the head lug 20 and thereby forces the tips or toes 23, 23 into holding relation with the bottom of the lug 20.

Figure 6:
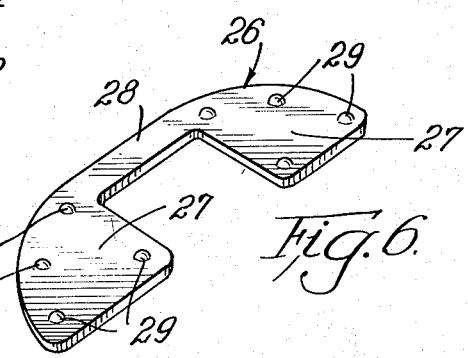
Figure 6 is a perspective view of an auxiliary wear plate to provide added thickness under certain conditions; the auxiliary plate being adapted to be integrally applied to the plate portion of our improved means.

Figure 6 discloses an auxiliary wear take-up blank 26 of sheet metal stamped to provide a pair of spaced lobes 27, 27 matching the lobes 21, 21 and united at the rear edges by a tie bar 28. This auxiliary blank is adapted to be secured to the wear lobes or plate-like portions 21, with the tie bar 28 bridging the space between lobes 21, 21 at the rear or brake head facing or contacting edges.

The auxiliary element 26 is intimately secured to the main wear element in any suitable manner as by welding which is facilitated by the small punched-up protrusions 29.

In connection with brake heads which have previously been in use, the head lugs, by reason of the side motion of the shoes, have burrs rolled over the rear portion of the keyway, which restrict the use of a device that depends on the sides of the keyway for entrance of a wear plate having straight and parallel legs for fastening the wear plate to the head. To compensate for this condition, the wear plate legs must be shaped with the transverse twist shown to allow easy application into the key way which is narrower at the rear; and clearance must be provided for insertion of the shoe key. In constructing our improved wear plate from a single piece or blank, these conditions have been taken care of by tapering the plate legs from top to bottom and from front to rear, so that insertion of the shoe key will spread the legs into parallel relation and contact with the sides of the key way and force the toes of the legs under the head lug and thereby hold the wear plate in place against displacement when occasion necessitates withdrawal of the shoe key. The taper or twist from front to rear in the legs permits the legs to conform to a possible cast shape or the probable worn opening of the key way. This taper compensates for more than a minimum reduction in the given tolerance; as without this allowance, it is practically impossible to apply the wear plate universally to all brake heads.

As the brake shoe lug is open directly in front of the key way, the wear on the brake head lug is not commensurate with the rest of the head lug surface covered by the shoe lug, with the result that a raised portion 30 is formed on the head lug which interferes with the proper application of any wear plate that extends across this surface. Hence, the wear receiving lobes of our device are spaced as shown and united forward of the brake head lug, while the auxiliary plate 26 is provided with a narrow tie strip which is positioned rearwardly of the key way into which the shoe key is guided by the key wedge tongue 25 which curves or slopes forwardly as clearly shown in Figure 5 and forces the key and shoe rearwardly; the device acts as a shoe tightener.

In order to ensure the retention of the wear element holding legs, our wear plate or element is provided with holding legs which fit into the key way in the head lug, instead of employing holding legs which fit about the outer ends of the lug where they frequently are contacted and cut by the wheel flange, especially when the brake shoe is lost.

We have described what we believe to be the simplest and best embodiment of our invention, but certain modifications are possible and may be made without, however, departing from the spirit of our invention as defined in the appended claims.

What we claim is:

1. A brake head wear receiving device and key wedge means comprising, in combination with a brake head, a brake shoe, the head and shoe on their opposing sides being provided with vertically apertured interengaging lugs and an elongated shoe locking key disposed through the registered apertures of the head and shoe lugs for holding the shoe in place, a pair of spaced flat plate-like portions adapted to be disposed between the opposing faces of the head and shoe lugs, with the adjacent ends of said portions provided with downwardly disposed legs normally sloping toward each other at their lower ends to firmly engage the side edges of the key with the lower ends of the legs bent outwardly to provide head lug engaging toes; said legs adjacent their juncture with the plate-like portions being connected by an integral bar provided with an upwardly extending tongue adapted to bear against the forward face of said key.

2. A brake head wear receiving element composed of a pair of spaced flat-faced lobes spaced laterally a predetermined distance apart, the adjacent edges of said lobes terminating in downwardly disposed expansible legs which normally taper downwardly toward each other and terminate in laterally disposed toes extending away from each other, said lobes and legs being united by a tie strip adjacent the upper ends of the legs and parallel with the forward edge of the element and provided with an upwardly extending resilient tongue, and a companion member with laterally spaced lobes integral with a strip to be disposed along the rear edge of said element, said companion member being intimately secured to said element.

3. A single-piece brake head wear receiving and key wedge element for the shoe-supporting apertured lug of the brake head composed of a pair of laterally spaced flat-faced plate-like portions, the adjacent edges whereof have integral downwardly extending legs canted about their longitudinal axis, sloping toward each other and terminating at their bottoms in outwardly turned toes, said legs being of predetermined length and spreadable and said toes thereby forced laterally into holding position beneath the shoe-supporting head lug; the legs adjacent their juncture with the plate-like portions and at the forwardly facing side of the element being united by a bar, the lower edge whereof terminates in an upwardly extending resilient tongue.

THEODORE J. SWEGER.
MALCOLM S. JOHNSON.

References Cited in the file of this patent

UNITED STATES PATENTS

| Number | Name | Date |
| --- | --- | --- |
| 2,023,095 | Parker | Dec. 3, 1935 |
| 2,088,126 | Wright | July 27, 1937 |
| 2,110,574 | Harbert et al. | Mar. 8, 1938 |
| 2,283,637 | Johnson | May 19, 1942 |
| 2,301,244 | Bishop | Nov. 10, 1942 |
| 2,377,371 | Prentice | June 5, 1945 |